(12) United States Patent
Huenink et al.

(10) Patent No.: US 11,772,562 B2
(45) Date of Patent: Oct. 3, 2023

(54) INTUITIVE WORK VEHICLE VISION SYSTEM FOR ENHANCED OPERATOR VISIBILITY

(71) Applicant: Deere & Company, Moline, IL (US)

(72) Inventors: Brian M. Huenink, Waterloo, IA (US); Jeremy B. Shuler, Waterloo, IA (US); Jake Flanders, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/673,032

(22) Filed: Feb. 16, 2022

(65) Prior Publication Data
US 2022/0305999 A1  Sep. 29, 2022

Related U.S. Application Data

(60) Provisional application No. 63/175,334, filed on Apr. 15, 2021, provisional application No. 63/165,677, filed on Mar. 24, 2021.

(51) Int. Cl.
*B60R 1/27* (2022.01)
*B60R 1/28* (2022.01)
(Continued)

(52) U.S. Cl.
CPC ............ *B60R 1/27* (2022.01); *A01B 76/00* (2013.01); *B60R 1/0605* (2013.01); *B60R 1/12* (2013.01);
(Continued)

(58) Field of Classification Search
CPC .......... B60R 1/27; B60R 1/0605; B60R 1/12; B60R 1/22; B60R 1/28; B60R 11/04;
(Continued)

(56) References Cited

U.S. PATENT DOCUMENTS 10,259,383 B1  4/2019  Campbell
10,324,461 B2  6/2019  Ogura et al.
(Continued)

FOREIGN PATENT DOCUMENTS

DE   112013000566 T5   11/2014
DE   102020211905 A1    4/2021
(Continued)

OTHER PUBLICATIONS

USPTO Non-Final Office Action issued in U.S. Appl. No. 17/673,038 dated Feb. 21, 2023. (24 pages).
(Continued)

*Primary Examiner* — Sath V Perungavoor
*Assistant Examiner* — Tyler B Edwards
(74) *Attorney, Agent, or Firm* — Klintworth & Rozenblat IP LLP

(57) ABSTRACT

A work vehicle has display devices and cameras coupled to display feeds at display areas. The cameras include a first set on the first side, second side, and central location relative to the first FOV and a second set on a first side, second side, and central location relative to the second FOV. A control system is configured to: in a first mode, display a first set of feeds from the first side, second side, and central location of the display areas so that the feeds are arranged at the first side, second side, and central location relative to the first FOV; and in a second mode, display a second set of feeds from the first side, second side, and central location of the second set at display areas so that the feeds are arranged at the first side, second side, and central location relative to the second FOV.

20 Claims, 7 Drawing Sheets

(51) Int. Cl.

| | |
|---|---|
| *B60R 1/12* | (2006.01) |
| *B60R 1/06* | (2006.01) |
| *B60R 11/04* | (2006.01) |
| *A01B 76/00* | (2006.01) |
| *H04N 7/18* | (2006.01) |
| *B60R 1/22* | (2022.01) |
| *G06F 3/14* | (2006.01) |
| *H04N 23/60* | (2023.01) |
| *H04N 23/90* | (2023.01) |
| *B60R 11/00* | (2006.01) |
| *A01C 23/00* | (2006.01) |
| *A01D 90/10* | (2006.01) |
| *A01M 7/00* | (2006.01) |

(52) U.S. Cl.
CPC .................. *B60R 1/22* (2022.01); *B60R 1/28* (2022.01); *B60R 11/04* (2013.01); *G06F 3/1423* (2013.01); *H04N 7/181* (2013.01); *H04N 23/60* (2023.01); *H04N 23/90* (2023.01); *A01C 23/008* (2013.01); *A01D 90/10* (2013.01); *A01M 7/0071* (2013.01); *A01M 7/0085* (2013.01); *B60R 2001/1253* (2013.01); *B60R 2011/004* (2013.01); *B60R 2300/101* (2013.01); *B60R 2300/105* (2013.01); *B60R 2300/20* (2013.01); *B60R 2300/202* (2013.01); *B60R 2300/303* (2013.01); *B60R 2300/305* (2013.01)

(58) Field of Classification Search
CPC ....... B60R 2001/1253; B60R 2011/004; B60R 2300/101; B60R 2300/105; B60R 2300/20; B60R 2300/202; B60R 2300/303; B60R 2300/305; B60R 2300/607; B60R 2300/70; A01B 76/00; G06F 3/1423; H04N 7/181; H04N 23/60; H04N 23/90; A01C 23/008; A01D 90/10; A01D 41/127; A01D 75/185; A01M 7/0071; A01M 7/0085; G09G 2380/10

See application file for complete search history.

(56) References Cited

U.S. PATENT DOCUMENTS

| | | | |
|---|---|---|---|
| 10,391,940 B2 | 8/2019 | Izumikawa et al. | |
| 10,450,169 B2 | 10/2019 | Oishi | |
| 10,589,679 B1 | 3/2020 | Askeland | |
| 10,668,854 B2 | 6/2020 | Imaizumi et al. | |
| 11,040,660 B2 | 6/2021 | Yamaguchi | |
| 11,447,928 B2 | 9/2022 | Hatake et al. | |
| 11,533,835 B2 | 12/2022 | Kurogi | |
| 2015/0217691 A1 | 8/2015 | Tanuki et al. | |
| 2017/0315771 A1* | 11/2017 | Kerr | H04N 7/181 |
| 2018/0027179 A1 | 1/2018 | Matsuzaki et al. | |
| 2018/0370432 A1 | 12/2018 | Imaizumi et al. | |
| 2019/0166760 A1 | 6/2019 | Palla et al. | |
| 2020/0407948 A1 | 12/2020 | Seki | |
| 2021/0002863 A1 | 1/2021 | Sakuta et al. | |
| 2021/0043085 A1 | 2/2021 | Kreiling et al. | |
| 2021/0155167 A1* | 5/2021 | Lynam | B60R 1/12 |
| 2021/0246635 A1 | 8/2021 | Tsukamoto et al. | |
| 2021/0291733 A1 | 9/2021 | Ding et al. | |
| 2021/0307230 A1 | 10/2021 | Kurogi | |
| 2021/0350681 A1 | 11/2021 | Imaizumi et al. | |
| 2021/0377492 A1* | 12/2021 | Zieser | G06F 3/14 |
| 2022/0074171 A1 | 3/2022 | Izumikawa et al. | |
| 2022/0118915 A1* | 4/2022 | Pastoor | H04N 7/188 |
| 2022/0212602 A1 | 7/2022 | Watanabe et al. | |

FOREIGN PATENT DOCUMENTS

| | | |
|---|---|---|
| DE | 102021200028 A1 | 8/2021 |
| DE | 102021201728 A1 | 9/2021 |

OTHER PUBLICATIONS

USPTO Non-Final Office Action issued in U.S. Appl. No. 17/673,026 dated Jan. 18, 2023. (30 pages).
YouTube, 360 Camera with Split-View Display—Ford How-To, https://www.youtube.com/watch?v=2asWY4qcJtl, Mar. 21, 2017 (2 pages).
YouTube, 2020 Silverado HD Invisible Trailer Mode and its 15 Cameras, https://www.youtube.com/watch?v=xox-Ym9ZW8k, Oct. 30, 2019 (1 page).
YouTube, How to Use the Different Camera Views of Surround View—BMW How-To, https://www.youtube.com/watch?v=RziW6FPfLGQApr. 17, 2019 (1 page).
YouTube, F-150 Backup Camera, https://www.youtube.com/watch?v=xtMCvXxH15o, Jul. 17, 2017 (1 page).
YouTube, Honda's Multi-Angle Rearview Camera, https://www.youtube.com/watch?v=MxO8k0a1nWg, Sep. 15, 2020 (2 pages).
German Search Report for application No. 102022206814.9 dated Feb. 28, 2023.
German Search Report for application No. 102022206817.3 dated Mar. 3, 2023.
German Search Report for application No. 102022206818.1 dated Mar. 6, 2023.
AGCO News Releases "AGCO Debuts the FendtOne Operator Interface—Next Generation of Popular Fendt 700 Series Tractors Introduced" at https://news.agcocorp.com/news/agco-debuts-the-fendtone-operator-interface, Aug. 25, 2020. (9 pages).
FENDT Smart Farming "FendtOne is Your Future—Jump Onboard" at https://www.fendt.com/us/smart-farming/fendtone, 2001. (6 pages).
New Holland iVT magazine article "Inspiring Style New Holland and Pininfarina are Making this a Vintage Year for Aesthetics with their Vineyard Straddle-Tractor Concept—Raise a Glass!" at iVTInternational.com, Mar. 2022. (6 pages).
USPTO Final Office Action issued in U.S. Appl. No. 17/673,026 dated May 2, 2023. (44 pages).
USPTO Final Office Action issued in U.S. Appl. No. 17/673,038 dated Aug. 18, 2023.

* cited by examiner

INTUITIVE WORK VEHICLE VISION SYSTEM FOR ENHANCED OPERATOR VISIBILITY

CROSS-REFERENCE TO RELATED APPLICATION(S)

This application is a nonprovisional application, and claims priority to, of both of U.S. Provisional Patent Application No. 63/165,677 filed Mar. 24, 2021 and U.S. Provisional Patent Application No. 63/175,334 filed Apr. 15, 2021, each of which is hereby incorporated by reference.

STATEMENT OF FEDERALLY SPONSORED RESEARCH OR DEVELOPMENT

Not applicable.

FIELD OF THE DISCLOSURE

This disclosure generally relates a work vehicle system and method, and more specifically to a multi-camera vision or video display system and method for a work vehicle or fleet of work vehicles.

BACKGROUND OF THE DISCLOSURE

Work vehicles utilized within construction, agriculture, forestry, mining, and other industries commonly operate in challenging work environments. Operators are often required to carefully navigate such work vehicles, while performing various tasks and avoiding surrounding structures, neighboring work vehicles, and other obstacles. A given work vehicle may be a sizable and complex machine, requiring a relatively high level of operator skill to control the various functions of the work vehicle, in many instances including the movement of boom-mounted implements or other end effectors. Concurrently, visibility from the operator station or cabin of the work vehicle may be limited by the chassis of the work vehicle, by the positioning of implements relative to the cabin, or other visual hinderances. For this reason, certain work vehicles are now equipped with camera systems or "vision systems" providing operators with various views of the surrounding environment.

SUMMARY OF THE DISCLOSURE

The disclosure provides a work vehicle vision system and method for a work vehicle and/or a fleet of work vehicles.

In one aspect, the disclosure provides a work vehicle with an operator cabin defining a first operator field of view (FOV) aligned with a longitudinal axis extending in a travel direction of the work vehicle, the operator cabin defining a second operator FOV extending along a transverse axis at an angle to the longitudinal axis; one or more display devices within the operator cabin defining a plurality of display areas arranged at a first side, a second side, and a central location between the first and second sides relative to the first operator FOV; and a plurality of cameras carried by the work vehicle and coupled to the one or more displays to display feeds at the plurality of display areas. The plurality of cameras includes a first set of the plurality of cameras at or trained on the first side, the second side, and the central location between the first and second sides relative to the first operator FOV; and a second set of the plurality of cameras at or trained on a first side, a second side, and a central location between the first and second sides relative to the second operator FOV. The work vehicle further includes a control system having processing architecture configured to control, or receive control instructions regarding, the selection of feeds to display at the plurality of display areas. The control system is configured to: when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

In another aspect, the disclosure provides a vision system for a work vehicle with an operator cabin defining a first operator field of view (FOV) aligned with a longitudinal axis extending in a travel direction of the work vehicle, the operator cabin defining a second operator FOV extending along a transverse axis at an angle to the longitudinal axis. The vision system includes one or more display devices within the operator cabin defining a plurality of display areas arranged at a first side, a second side, and a central location between the first and second sides relative to the first operator FOV and a plurality of cameras carried by the work vehicle and coupled to the one or more displays to display feeds at the plurality of display areas. The plurality of cameras includes a first set of the plurality of cameras at or trained on the first side, the second side, and the central location between the first and second sides relative to the first operator FOV; and a second set of the plurality of cameras at or trained on a first side, a second side, and a central location between the first and second sides relative to the second operator FOV. The vision system further includes a control system having processing architecture configured to control, or receive control instructions regarding, the selection of feeds to display at the plurality of display areas. The control system is configured to: when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1A:
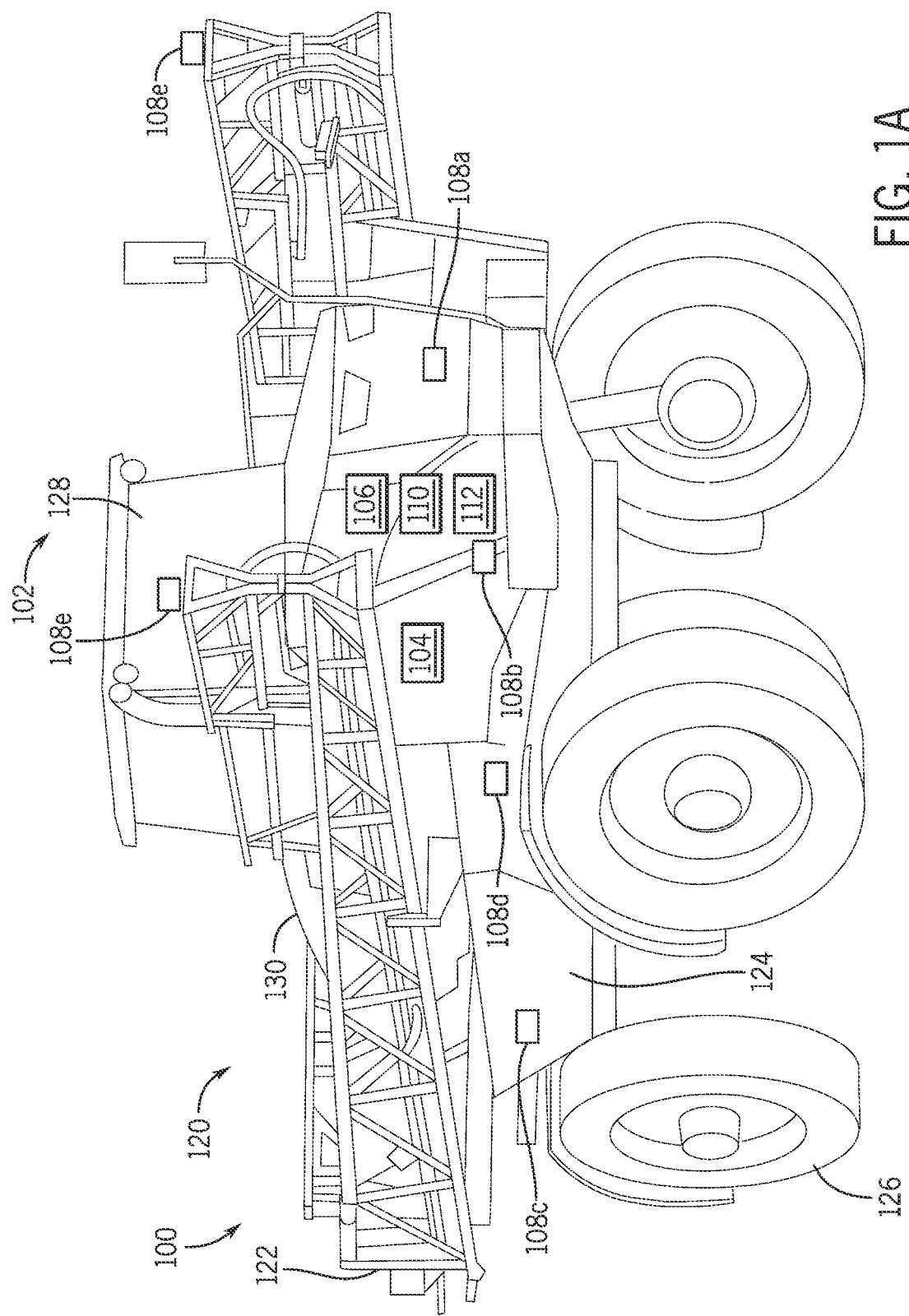
FIGS. 1A-1C are views of a first example work vehicle with a vision system in accordance with an embodiment of this disclosure.

This disclosure generally relates to work vehicle multi-camera vision or video display system that enables an operator of a work vehicle to intuitively monitor multiple camera feeds providing different views around and/or within the work vehicle. The following describes one or more example embodiments of the disclosed vision system, method, work vehicle, or fleet, as shown in the accompanying figures of the drawings described briefly above. Various modifications to the example embodiments may be contemplated by one of skill in the art.

In the agriculture, construction, and forestry industries, work vehicles are utilized to perform tasks in various types of environments. Operators are often required to carefully navigate such environment, while performing various tasks and avoiding surrounding structures, neighboring work vehicles, and other obstacles. Visibility from the operator station or cabin of the work vehicle may be limited by the chassis of the work vehicle, by the positioning of the work implements relative to the cabin, or other visual hinderances, as well as by unfamiliar displays and systems. For this reason, work vehicles may be equipped with camera systems or "vision systems" providing operators with a display arrangement on which the camera feeds are presented for operator viewing.

This notwithstanding, it can be difficult to design a multi-camera vision system simultaneously providing an operator with multiple camera feeds, while further permitting the operator to readily receive and understand the feeds. Moreover, although many types of work vehicles have cameras, such views are conventionally very specific, such as views of a front hitch, a rear hitch, a discharge spout, and/or a seed or grain tank. However, these views typically only cover a portion of the overall operational need. Such needs may be dramatically different between operators, operations, and/or from one machine or model to the next. Additionally, operator attempts at obtaining preferred views in conventional systems may involve uncomfortable operator positions, leaving the cabin, using a spotter, or making assumptions about the vehicle environment. In a multi-camera system, it may be difficult for an operator to quickly ascertain the context of each view. Thus, if not properly designed, multi-camera vision systems can potentially intensify operator mental workload and increase heads-down time.

Overcoming many, if not all of the above-noted disadvantages, the systems and methods described herein enabling operators to monitor and navigate between multiple camera feeds associated with a work vehicle in a highly intuitive manner. In embodiments, the multi-camera vision system includes multiple cameras mounted at different locations about a given work vehicle to capture camera (live video) feeds of the work vehicle's surrounding environment from various different vantage points, viewpoints or viewing angles. Embodiments of the multi-camera vision system may include at least one, if not multiple rear, forward, left side, right side, and interior (e.g., in operational, filling, loading, unloading areas) vehicle cameras, depending upon work vehicle size, type, and other factors. The vehicle-mounted cameras (or, more simply, "vehicle cameras") can each capture any desired portion or region of a work vehicle's surrounding environment, whether generally located to the front, to a side, or to the rear of the work vehicle.

Embodiments of the multi-camera vision system further include a controller and at least one display device, which functions within a cabin or other operator station of the work vehicle. During operation of the multi-camera vision system, the controller supplies the display device with appropriate signals (video output signals) to generate a multi-camera display on a screen of the display device. In the manner described herein, a highly intuitive multi-camera display is thus created enabling an operator of a work vehicle to readily appreciate the availability of multiple camera feeds, to simultaneously monitor the content of each camera feed, and to intuitively determine the camera feeds being presented on the various display devices. As such, the present disclosure is directed to an integrated system and method that enhance operational performance by intelligently showing needed information and/or imagery in a consistent and repeatable manner across cab platforms and products.

According to the present disclosure, many large and medium sized agricultural machines have common visibility themes that may accommodated by a platform implemented as a vision system or method across fleets of similar or different machines, thereby creating a familiarity and expectation for the operator from one machine to the other. Selected views may optimally reduce the need for an operator to swivel or leave the cab as often, thereby saving time, mitigating fatigue, and improving effectiveness and efficiency. This further results in improved operator experience that may be mapped and relatable from machine to machine to reduce set up time. Moreover, the system is flexible to accommodate supplemental views for unique visual perspectives without an added secondary video system that would otherwise be required. Thus, operators of different machine platforms can view feeds of similar areas around or features of each machine in similar or common display areas within the operator cabin. As a result, the vision system provides improved visibility during transport and in field to prevent damage to machines and property, aid in operation, and gain trust and validation in automation via a collection of standardized views.

In one example, one or more display devices may be provided along a forward upper headliner within the cabin to provide optimal views in the forward direction within an ergonomic field of view of the operator. The positioning of the display devices enable an operator to focus in the forward view on the task at hand with less distractions of physical contortions or frequent stopping to access job quality, spatial awareness, and the like. The present disclosure provides a modular or scalable solution that may be used across multiple platforms with varying needs to provide a backbone that may then be iterated upon to rapidly adapt to customer display needs. Moreover, the vision system may be configurable and have the capability to determine the operational context and implement an appropriate configuration to automatically render the images and information that are most appropriate or useful for the context. In some examples, information may be provided by the vision system within themes or situations of operation (e.g., planting, tilling, harvest, transport, etc.) to provide the most useful views and/or to reduce the setup time for each specific operation at different operator fields of view (e.g., a forward view for a transport situation, straight ahead view for a working situation, and/or an implement view when using an implement). In particular, different camera groupings for each field of view can be selected and displayed in an intuitive manner for the operator.

As appearing herein, the term "surrounding environment" is utilized in a broad sense to refer to a work environment or area located outside of a work vehicle, whether generally located to the front, to a side, or to the rear of the work vehicle, or any combination thereof. Further, the term "display" refers an image or "picture" generated on the screen of a display device, while the term "display device" refers to an image-generating device on which a display (e.g., the below-described multi-camera display) is presented. The terms "front," "rear," "right," "central," "left", "forward", and "rearward" may be defined relative to the orientation of an operator when seated in the operator station (e.g., cabin) of the work vehicle in a forward-facing position.

Additional details regarding the multi-camera vision or video display system and method for a work vehicle or fleet of work vehicles will be provided below.

Figure 1B:
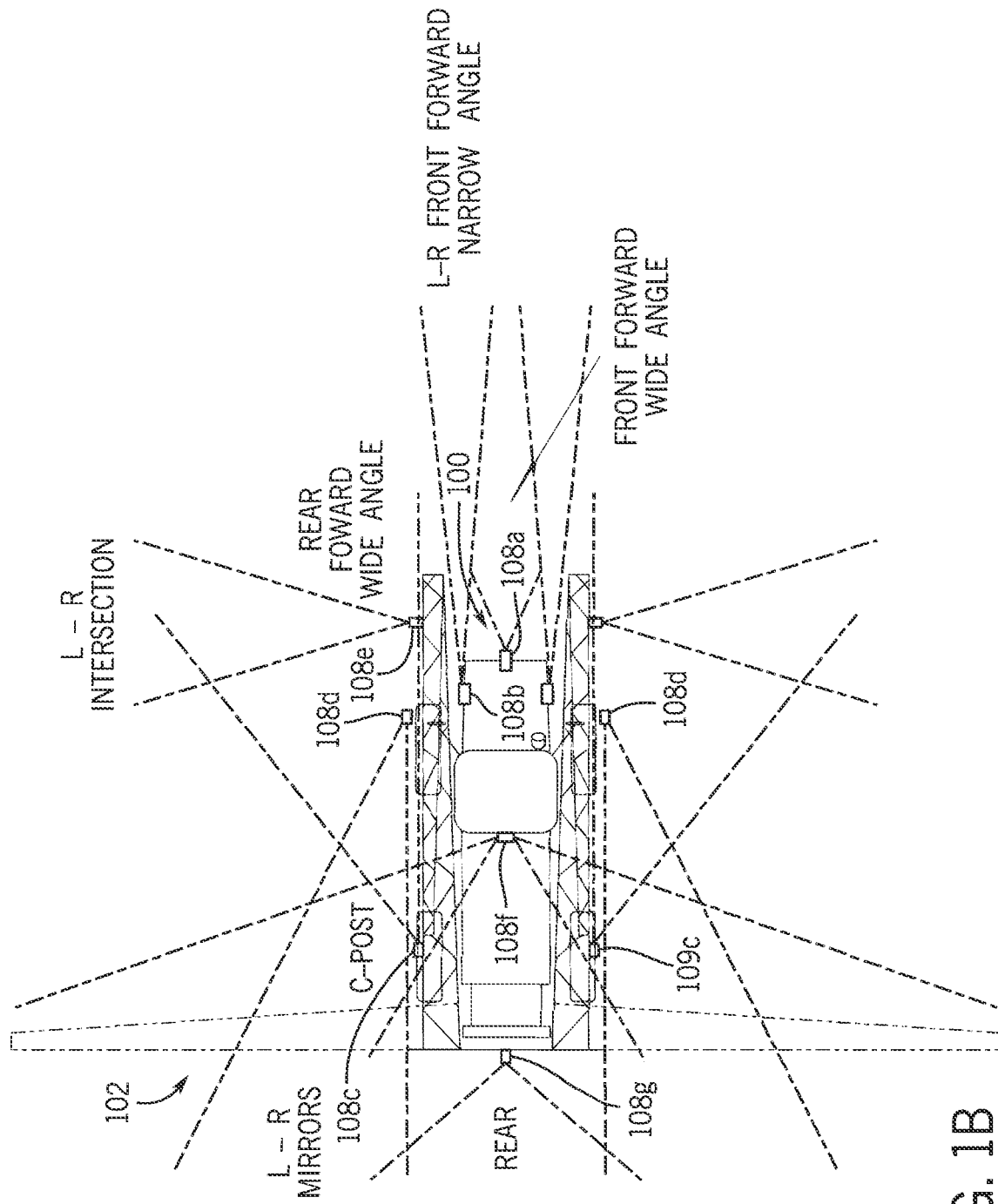
Figure 1C:
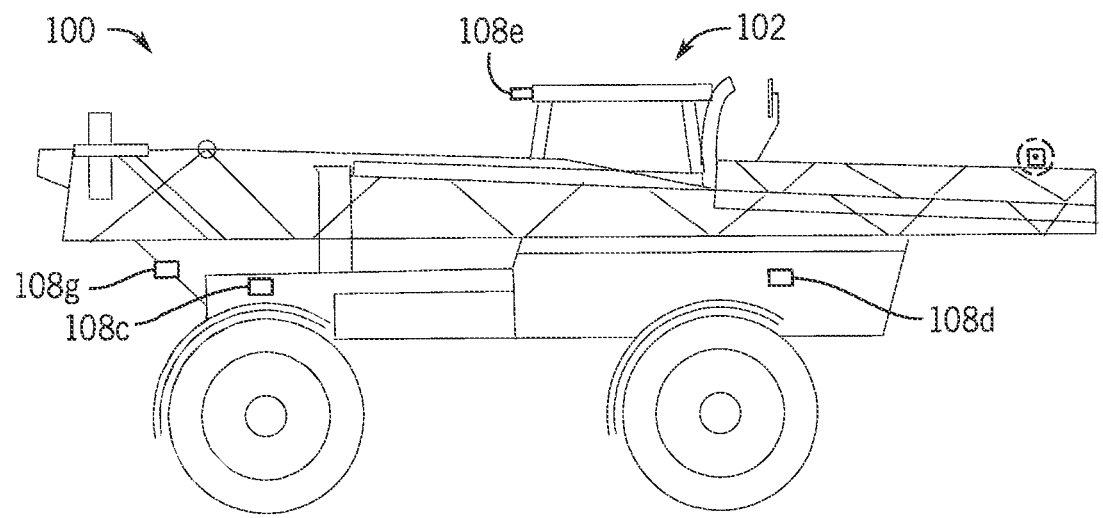

FIGS. 1A-1C are views of a self-propelled work vehicle (or sprayer) 100 on which an intuitive work vehicle vision system 102 may be implemented for enhanced operator visibility. The view of FIG. 1A is an isometric view of the work vehicle 100; the view of FIG. 1B is a plan view of the work vehicle 100; and the view of FIG. 1C is a side view of the work vehicle 100. Generally, the vision system 102 may be considered to include a controller (or control system) 104, one or more operator interfaces 106, a set of cameras 108, a display arrangement 110, and one or more sensors 112, each of which will be described in greater detail below after an introduction of the other components of the work vehicle 100.

Although the vision system 102 is described with reference to a sprayer as the work vehicle 100 in FIGS. 1A-1C, the vision system 102 may be implemented in any type of work vehicle. In particular, other work vehicles may have similar controllers, cameras, display arrangements, and sensors that provide a common "look and feel" across different vehicles, including other models and types of vehicles. In effect, the vision system 102 may provide a common and consistent set of views to increase operator confidence and consistency when changing vehicles.

In the example of FIGS. 1A-1C, the work vehicle 100 as a sprayer is equipped with various types of apparatuses to perform a work function (e.g., spraying), including in this example, a spray system 120 with spray booms 122 mounted to the rear or aft end of a chassis 124. The chassis 124 of the work vehicle 100 is supported by a number of ground-engaging wheels 126, which are driven by an engine (not shown in detail) contained in an engine compartment adjacent an operator station or cabin 128 of the work vehicle 100. Although not shown in detail, the spray system 120 includes a spray material delivery arrangement carried by the chassis 124 with one or more supply tanks 130 that hold and supply spray solution (or other liquid material) for distribution. The spray solution is distributed via a number of spray system equipment (e.g., nozzles, valves, feed pipes, supply pipes, lines, flexible tubing, etc.) as the work vehicle 100 travels over the field under operator command or under autonomous command.

In the example of FIGS. 1A-1C, segments of the spray booms 122 are folded, such as for transport or storage. Upon deployment, the segments of the spray booms 122 are extended from each side of the work vehicle 100 in a generally transverse orientation. In the discussion herein, the term "longitudinal" refers to a generally axis of travel of the vehicle 100 (e.g., from front to back); and the term "transverse" refers to the direction parallel to a longitudinal axis (e.g., side to side). In the example of FIGS. 1A-1C, the spray booms 122 are folded, such as for transport or storage.

Although not shown or discussed in detail, the work vehicle 100 may have additional systems and components typical for such vehicles, including a propulsion system, a steering system, a braking system, and various actuation systems that facilitate operation of the work vehicle 100 based on operator commands (e.g., via operator interface 106).

Returning to the vision system 102, the controller 104 generally implements operation of the vision system 102, as well as other systems and components of the work vehicle 100, including any of the functions described herein. The controller 104 may be configured as computing devices with associated processor devices and memory architectures. The controller 104 may encompass or may be associated with any practical number of processors (central and graphical processing units), control computers, navigational equipment pieces, computer-readable memories, power supplies, storage devices, interface cards, and other standardized components. The controller may also include or cooperate with any number of firmware and software programs or computer-readable instructions designed to carry-out the various process tasks, calculations, and control/display functions described herein. Such computer-readable instructions may be stored within a non-volatile sector of a memory associated with the controller. The memory can encompass any number and type of storage media suitable for storing computer-readable code or instructions, as well as other data utilized to support the operation of the multi-camera vision system. The memory may be integrated into the controller 104 in embodiments as, for example, a system-in-package, a system-on-a-chip, or another type of microelectronic package or module.

As such, the controller 104 may be configured to execute various computational and control functionality with respect to the vehicle 100. The controller 104 may be in electronic, hydraulic, or other communication with various other systems or devices of the vehicle 100, including via a CAN bus (not shown). For example, the controller 104 may be in electronic or hydraulic communication with various actuators, sensors, and other devices within (or outside of) the vehicle 100. The controller 104 may include or otherwise access various types of datastores, including at least one datastore associated with the vision system 102.

In some embodiments, the controller 104 may be configured to receive input commands and to interface with an operator via the operator interface 106, including typical steering, acceleration, velocity, transmission, and wheel braking controls, as well as other suitable controls. The operator interface 106 may be configured in a variety of ways and may include one or more joysticks, various switches or levers, one or more buttons, a touchscreen interface, a keyboard, a speaker, a microphone associated with a speech recognition system, or various other human-machine interface devices.

As introduced above, the vision system 102 may include a set of cameras 108 arranged around and within the work vehicle 100. Although a number of example cameras 108 are discussed below, additional cameras may be provided and/or one or more of the cameras discussed below may be omitted. Further, while primarily described below as video cameras capturing imagery falling within the visible band of the electromagnetic spectrum, other types of imaging devices (e.g., infrared cameras) can also be integrated into the multi-camera vision system in alternative implementations, with the imagery captured by such devices presented on the below-described multi-camera display accordingly. The vehicle cameras 108 are operably coupled to (that is, in signal communication with) the controllers 104 with either wireless or wired data connections. The set of cameras 108 includes a number of depicted cameras 108a-108g, as best shown by FIG. 1B with associated field of views (FOVs).

The set of cameras 108 may include a front camera 108a positioned on a relative forward part of the chassis 124 of the vehicle 100 and oriented in a forward direction of travel. The front camera 108a may provide a relatively wide angle FOV to capture views of machine clearance and/or objects immediately in front of the work vehicle 100.

The set of cameras 108 may further include left and right front forward-facing cameras 108b positioned on a relative front or forward part of the side of the vehicle 100 and oriented in a forward direction of travel. The left and right front forward-facing cameras 108b provide and relatively narrow angle FOVs to capture views of machine clearance, obstacle, implements, and the like.

The set of cameras 108 may further include left and right rear forward-facing cameras 108c positioned on a relative rear part of the side of the vehicle and oriented in a forward direction of travel. The left and right rear forward-facing cameras 108c provide relatively wide FOVs for views of machine clearance, particularly when encountering relatively narrow roadways, oncoming attractions, and other obstructions.

The set of cameras 108 may further include left and right "mirror" cameras 108d positioned on a forward or middle part of the side of the vehicle 100 (e.g., in respective positions corresponding to side mirrors of an automobile) and oriented in a rearward direction of travel. The left and right mirror cameras 108d provide views of along the sides of the work vehicle 100.

The set of cameras 108 may further include left and right intersection cameras 108e positioned on a relatively forward or part of the side or hood of the vehicle 100 and oriented in a side-to-side or along transverse axis to the direction of travel. The left and right intersection cameras 108e provide views around any obstructions, particularly at intersections or upon entering roadways.

The set of cameras 108 may further include one or more "C-post" cameras 108f positioned on the sides of the vehicle cabin 128 and oriented in a side-to-side or along transverse axis to the direction of travel. The left and right C-post cameras 108f provide views along an extended boom 122, e.g., during a spraying operation.

The set of cameras 108 may further include at least one rear camera 108g that positioned on a rear portion of the vehicle 100 and oriented rearward. The rear camera 108g may be adjustable and generally provides views of trailing traffic and any center section or portion of towed implements (e.g., sprayers) at the rear of the vehicle.

One or more of the cameras 108 depicted in FIG. 1 may be omitted, and/or one or more cameras may be added. For example, although not shown, the cameras may further include one or more cameras associated with implements or working apparatuses (e.g., to load or unload bins or tanks 130).

In one particular example, the vision system 102 includes the display arrangement 110 with one or more display devices render displays based on commands from the controller 104. Generally, the display devices of the display arrangement 110 may be otherwise standard display devices within the cabin 128, such as LCD or LED screens. The display devices of display arrangement 110 may be mounted on the cab console, window-mounted, or head-mounted. In addition to display arrangement 110, other output devices may be utilized to convey all or a portion of the information discussed below, including analog or digital gauges, other graphical or textual displays, and audio or haptic mechanisms. Examples of the displays generated by the controller 104 and rendered on the display arrangement 110 are discussed in greater detail below.

As introduced above, the vision system 102 may, in some examples, include one or more sensors 112 that facilitate any of the operation described herein. For example, the sensors 112 may include environment sensors that collect information about the environment of the work vehicle 100; position sensors that collect information associated with the location, velocity, acceleration, heading, and/or orientation of the work vehicle 100; and/or vehicle sensors that collect information associated with the various components, systems, and/or implements on the work vehicle 100.

As described below, the vision system 102 operates to display selected feeds from the cameras 108 on the various display devices of display arrangement 110 based on display signals from the controller 104, which in turn are based on operator inputs via the operator interface 106, sensor data from sensors 112, stored data, and/or other information. As noted, the vision system 102 may be implemented across similar or otherwise dissimilar work vehicles, including the work vehicle discussed below with reference to FIG. 2.

Figure 2:
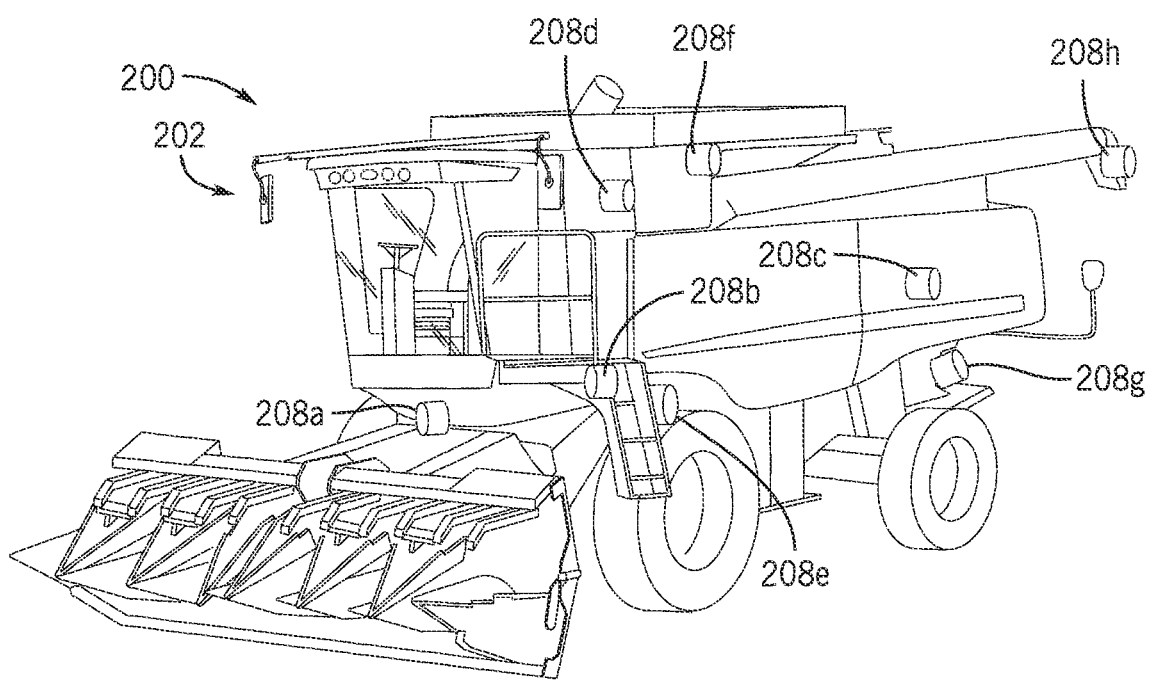
FIG. 2 is a view of a second example work vehicle with the vision system in accordance with an embodiment of this disclosure.

Generally, FIG. 2 is a schematic view of another agricultural work vehicle 200 in which a vision system 202 analogous to the vision system 102 discussed above and below may be implemented. Generally, the work vehicle 200 is in the form of a harvester with various apparatuses to perform a work task (e.g., harvesting), including a corn head that functions to process corn.

Unless otherwise noted, the vision system 202 of vehicle 200 performs the functions and generates analogous views to the vision system 102 of vehicle 100. As such, many of the analogous components (e.g., controller, operator interface, display arrangement, and sensors) will not be described again. The vision system 202 is merely presented as a further example of how the vision system according to the disclosure herein may be applied across vehicles and vehicle models. In some examples, settings for the vision systems 102, 202, some of which are described below, may be shared via a cloud-based data transfer and/or via key fobs or other operator-based identification. Due to the disparate functions and vehicle configurations, the vision system 202 of FIG. 2 may not have an identical set of cameras 208 as those of the vision system 102 of FIG. 1. However, one or more analogous views may be provided for each vision system 102, 202. For example, the cameras 208 (schematically shown) of vision system 202 may include a front camera 208a oriented at the front of the vehicle 200 and facing forward; left and right front forward-facing cameras 208b positioned on a relative front or forward part of the side of the vehicle 200 and oriented in a forward direction; left and right rear forward-facing cameras 208c positioned on a relative rear part of the side of the vehicle 200 and oriented in a forward; left and right mirror cameras 208*d* positioned on a forward or middle part of the side of the vehicle 200 (e.g., in respective positions corresponding to side mirrors of an automobile) and oriented in a rearward direction; left and right intersection cameras 208*e* positioned on a relatively forward or part of the side or hood of the vehicle 200 and oriented in a side-to-side or along transverse axis; cabin cameras 208*f* positioned on the sides of the vehicle cabin and oriented in a side-to-side or along transverse axis; at least one rear camera 208*g* that positioned on a rear portion of the vehicle 200 and oriented rearward; and an output camera 208*h* oriented on the end of the output chute. Generally, the vision system 202 operates in a similar manner to the vision system 102 introduced above and discussed in greater detail below.

In addition to the work vehicles 100, 200 of FIGS. 1A-1C and FIG. 2, the vision systems 102, 202 may be implemented on any type machine, including within agriculture, construction, or forestry industries. Additional examples include tractors, loaders, forager, tillers, dump trucks, backhoes, loaders, graders, dozers, scrapers, skid steers, feller bunders, and the like.

Figure 3A:
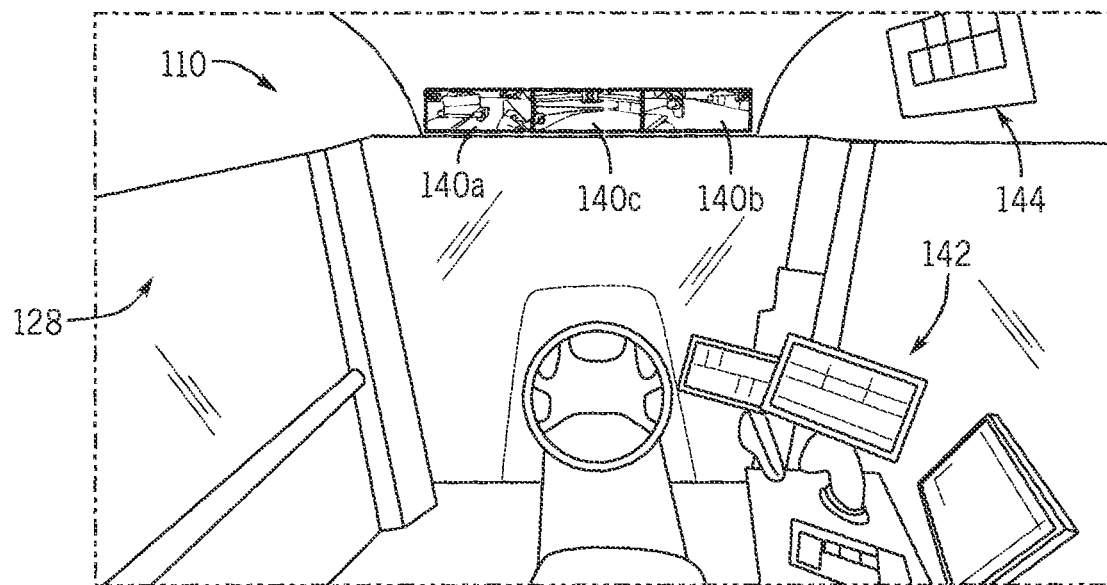
FIGS. 3A and 3B are cabin views of a display arrangement of the vision system in an example work vehicle in accordance with an embodiment of this disclosure.
Figure 3B:
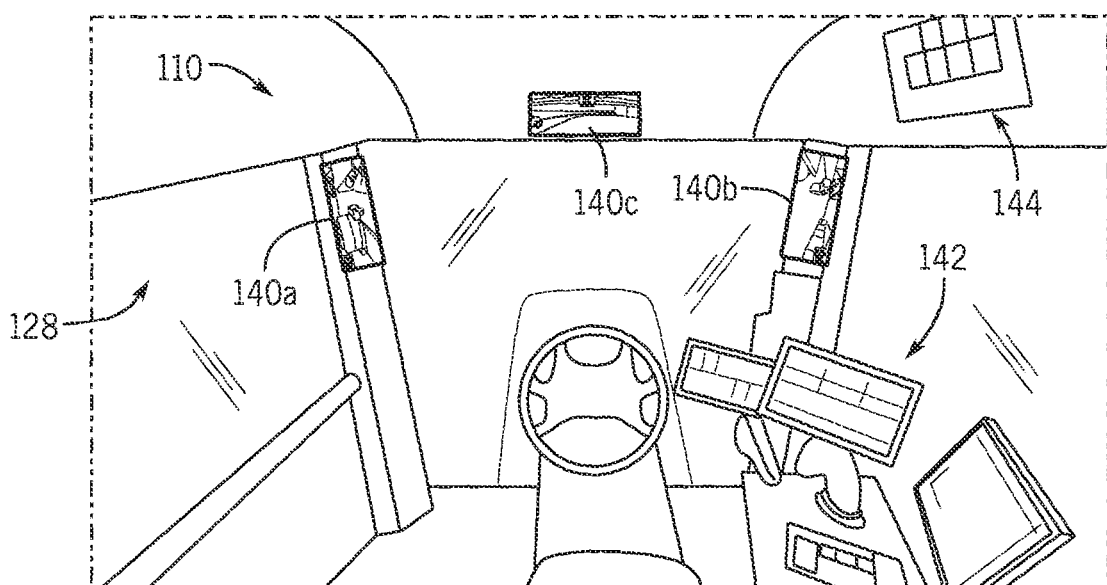

The views of FIGS. 3A and 3B provide examples of the display arrangement 110 in cabin 128 discussed above with reference to FIG. 1, although the configuration depicted therein may also be applicable to the vision system of other work vehicles. In one example, the display arrangement 110 may be considered three primary display devices 140*a*, 140*b*, 140*c*, which may be embodied as separate display devices and/or as a larger, single display device with individual screens or screen portions. The primary display devices 140*a*, 140*b*, 140*c* may be considered to include a first (or left) primary display device 140*a*, a second (or right) primary display device 140*b*, and a third (or center) primary display device 140*c*. In the example depicted by FIG. 3A, the primary display devices 140*a*, 140*b*, 140*c* are aligned horizontally, along a transverse axis, on the roof or on an upper portion of the windshield. In the example depicted by FIG. 3B, the first and second primary display devices 140*a*, 140*b* may be arranged on the C-posts on either side of the windshield, and the third primary display device 140*c* may be arranged on the roof or an upper portion of the windshield.

Generally, the primary display devices 140*a*, 140*b*, 140*c* provide intuitive views of the surrounding environment and/or within the work vehicle based in a manner that improves the spatial awareness and understanding of the operator. A number of additional or auxiliary display devices 142, 144 may be provided that depict various types of information associated with the work vehicle, the task, the environment, and/or the fleet. The display devices 142, 144 may render information such as job quality, job settings, automation status, visibility, control or convenience configuration, state or configuration feedback, management data, platform or vehicle-specific information, infotainment, and the like.

Figure 4:
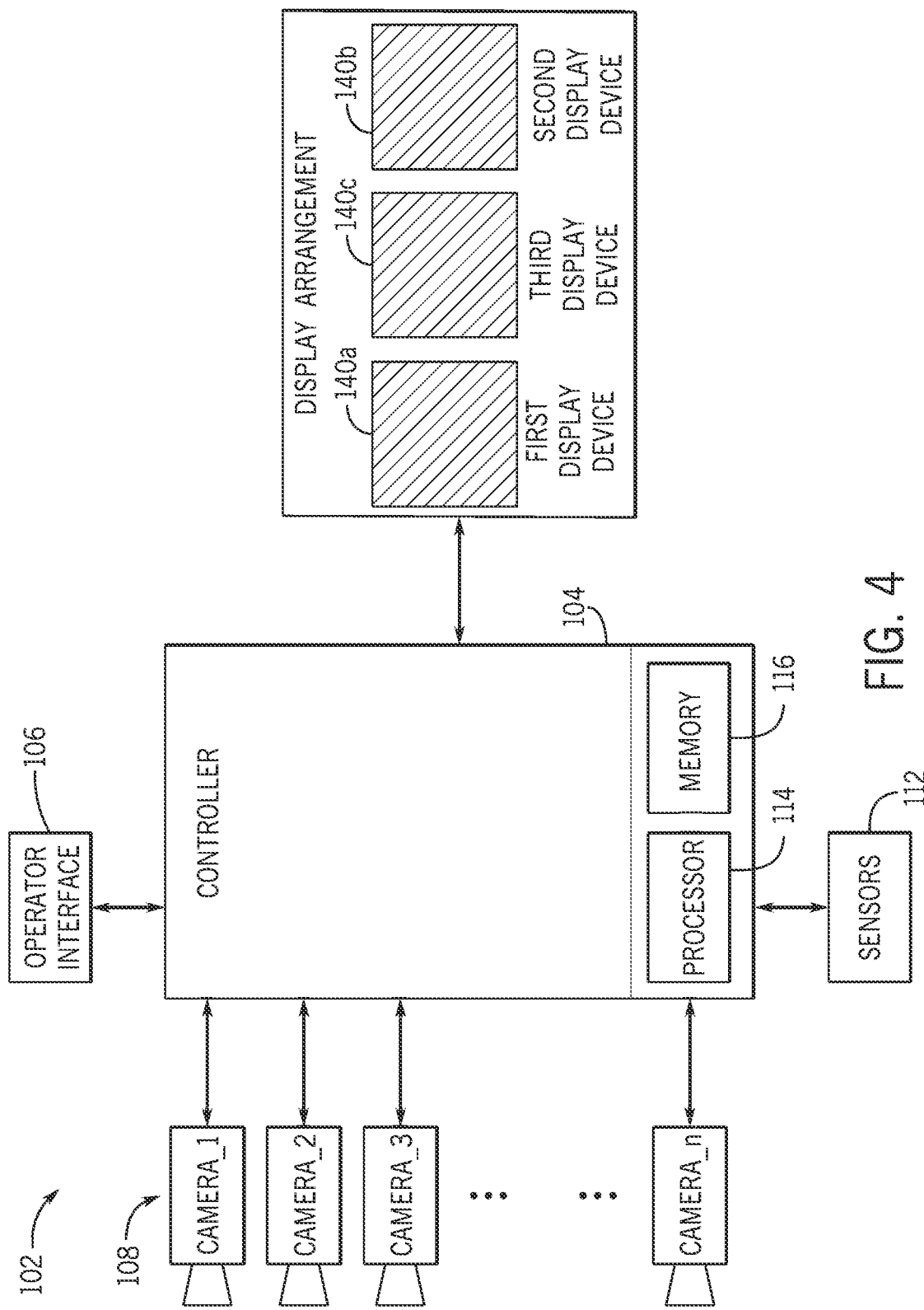
FIG. 4 is an example schematic block diagram of the vision system in accordance with an embodiment of this disclosure.

Referring to FIG. 4, a block diagram illustrates an embodiment of the vision system 102 implemented by the controller 104 (as well as operator interface 106, cameras 108, display arrangement 110, and sensors 112). Generally, the controller 104 may be considered a vehicle controller, a dedicated controller, or a combination of controllers. In some examples, the controller 104 may be organized as one or more functional units or modules (e.g., software, hardware, or combinations thereof). As an example, each of such modules may be implemented with processing architecture such as a processor 114 and memory 116, as well as suitable communication interfaces. For example, the controller 104 may implement the modules and/or functionality with the processor 114 based on programs or instructions stored in memory 116. In some examples, the consideration and implementation of the vision system 102 by the controller 104 are continuous, e.g., constantly active. In other examples, the activation may be selective, e.g., enabled or disabled based on input from the operator or other considerations.

Generally, the controller 104 may receive input data in a number of forms and/or from a number of sources, including the operator interface 106, cameras 108, and sensors 112, as well as various datastores, stored separately or in memory 116. Moreover, such input data may also come in from other systems or controllers, either internal or external to the work vehicle 100. This input data may represent any data sufficient to select and display the camera feeds on the appropriate display device 140*a*, 140*b*, 140*c* in a manner that provides an intuitive operator experience across work vehicles.

In particular, the controller 104 may receive camera feeds from the various cameras 108 representing the live video feed from each camera 108. At times, the controller 104 may receive input data from a number of cameras 108 that may be stitched together into a single video feed. Moreover, an individual camera 108 may be used to provide more than one video feed (e.g., breaking up a field of view into multiple feeds and/or separating out a feed into feeds with various levels of zoom or focus). The controller 104 may also receive sensor information from sensors 112 and/or operator input information from the operator interface 106; and/or platform or framework data from a datastore or memory 116.

In addition to the video feeds and images discussed below, the controller 104 may also provide and/or consider the camera feeds with respect to other systems associated with the work vehicle 100 (or fleet of vehicles). For example, the images of the camera feeds may be used in autonomous or semi-autonomous control operations. Moreover, such images may be remotely viewed or evaluated by a control or fleet operation.

Generally, the vision system 102 may have a preset or baseline setting that is common from vehicle to vehicle and/or from model to model. The preset baseline setting may result in analogous views being rendered on particular display devices, including modifying such views based on common conditions and/or situations. Such preset or baseline settings may be modified by the operator and/or owner of the work vehicle 100. In particular, the vision system 102 may receive operator information via the operator interface 106 or from another source (e.g., a key fob, smartphone, or remote communication). The operator settings may specify operator preferences for the displays discussed herein.

The controller 104 further receives sensor information, and such information may be evaluated to determine a present situation (or "mode") for the vehicle 100. Situation information may also be provided via the operator interface 106. The situations may include, as examples, a transport situation, an intersection situation, a folding/unfolding/parking situation, a working situation, and/or a filling/levels situation, which are discussed in greater detail below. Additional situations may be considered, including a fault situation, a preparation situation, a warm-up situation, and the like. The sensor information used to determine the situation may include vehicle speed, vehicle direction, gear, status of implements, and the like.

Generally, the controller 104 selects from the camera feeds and renders selected camera feeds on selected display devices 140a, 140b, 140c. In some examples, the controller 104 may activate a selected feed (e.g., activate or power the assigned camera) upon selecting the feed. As noted above, the display devices 140a, 140b, 140c are generally arranged in a left, right, and center configuration, respectively. Generally, the feeds assigned to each display device are selected to collectively maintain an intuitive left, right, and center configuration. For example, "center" views (e.g., either forward or rearward facing) are typically rendered on the third display device 140c, and "side" views (e.g., forward or rearward facing) are typically rendered on the first and second display devices 140a, 140b, as appropriate for the left and right views.

In one example, the controller 104 selects the camera feeds based on the determined situation, discussed above. In particular, as the situation changes, the displays rendered on the display devices 140a, 140b, 140c may be modified to present the feeds that are most appropriate or relevant to the situation. Examples are provided below with reference to FIGS. 5A-5E.

As such, in effect, the vision system 102 may be applicable to a work vehicle fleet in which each work vehicle (e.g., vehicles 100, 200) has a set of display devices within the operator cabin, each defining a plurality of display areas arranged at a first side of the respective work vehicle (e.g., device 140a), a second side of the respective work vehicle (e.g., device 140b), and a central location of the respective work vehicle (e.g., device 140c) between the first and second sides relative to an operator FOV (e.g., each operator FOV for the respective vehicle); a set of cameras (e.g., cameras 108) carried by each work vehicle, each set of cameras having a respective at least one camera at or trained on the first side, the second side and the central location between the first and second sides relative to each operator FOV; and a controller 104 configured to display a standard set of feeds from the associated first side, second side, and central location of each set of cameras at the first set of display areas so that the associated feeds are arranged at the first side, the second side and the central location, respectively, relative to the respective operator FOV. In other words, the vision system 102 may be implemented across different models or platforms to provide a consistent "look and feel" for an operator or operators. In the examples of FIGS. 1A-C and 2, the sprayer and harvester have analogous camera positions, display areas, and views or feeds provided to the operator.

Moreover, the vision system 102 may be applicable to a work vehicle with an operator cabin defining a first operator field of view (FOV) aligned with a longitudinal axis extending in a travel direction of the work vehicle and a second operator FOV extending along a transverse axis at an angle to the longitudinal axis; one or more display devices within the operator cabin defining a plurality of display areas arranged at a first side, a second side and a central location between the first and second sides relative to the first operator FOV; a plurality of cameras carried by the work vehicle and coupled to the one or more displays to display feeds at the plurality of display areas, the plurality of cameras including: a first set of the plurality of cameras at or trained on the first side, the second side and the central location between the first and second sides relative to the first operator FOV; and a second set of the plurality of cameras at or trained on a first side, a second side and a central location between the first and second sides relative to the second operator FOV; and a controller having processing architecture configured to control, or receive control instructions regarding, the selection of feeds to display at the plurality of display areas, the control system is configured to: when the work vehicle is in a first mode of operation, display a first set of feeds from the associated first side, second side and central location of the first set of the plurality of cameras at the plurality of display areas so that the associated feeds are arranged at the first side, the second side and the central location, respectively, relative to the first operator FOV; and when the work vehicle is in a second mode of operation, display a second set of feeds from the associated first side, second side and central location of the second set of the plurality of cameras at the plurality of display areas so that the associated feeds are arranged at the first side, the second side and the central location, respectively, relative to the second operator FOV.

As such, upon determining the appropriate settings, the situation, and/or context information, the controller 104 generates display commands for each display device 140a, 140b, 140c that to render the selected view, particularly of one or more work apparatuses performing a function. Upon generating the display signals and rending the displays, the controller 104 continues to collect information and update the display devices 140a, 140b, 140c.

FIGS. 5A-5E are schematic representations of example fields of view (FOVs) associated with the work vehicle (e.g., vehicle 100) in various situations, although other are possible and/or not all FOVs are required. Typically, each FOV is associated with a camera (e.g., cameras 108), and FOVs are depicted at situations in which the associated camera is active, on, and/or being displayed on one or more of the display devices (e.g., display devices 140a, 140b, 140c). It should be noted that, at times, the FOV of a particular camera may be modified, e.g., by adjusting the focal length or the orientation of the respective camera. Generally, the modes depicted in FIGS. 5A-5C may be considered "non-working modes" (e.g., transport mode, intersection mode, and/or set-up mode) and at least the mode depicted in FIG. 5D may be considered a "working mode." Depending on the particular task, the mode depicted in FIG. 5E (e.g., the filling mode) may be considered a working or non-working mode. As noted above, the vision system 102 may automatically determine the appropriate mode based on sensor information (e.g., based on speed; based on surroundings, such as roadway, field, or intersection; based on implement position; based on diagnostic, error, or alert codes; and the like).

Figure 5A:
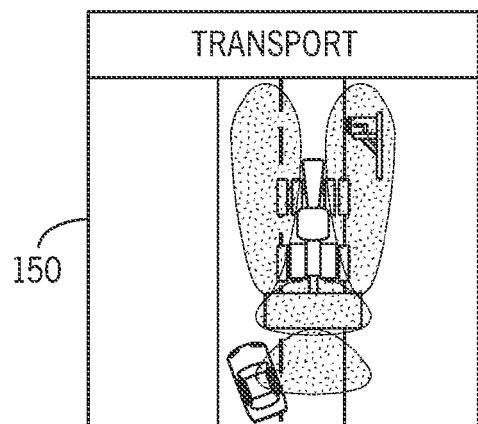
FIGS. 5A-5E are schematic example plan view representations of various fields of view (FOVs) associated with the vision system in accordance with an embodiment of this disclosure.

As shown in FIG. 5A, an implementation of the vision system 102 is depicted when the work vehicle is in a "transport" situation or mode, e.g., when the work vehicle 100 is traveling down a roadway. In the transport situation, left and right rear forward-facing cameras (e.g., rear forward-facing cameras 108c of FIG. 1B) are active such that the resulting FOVs are oriented along each side in a forward direction. Further in the transport situation, a rear camera (e.g., rear camera 108g of FIG. 1B) is active such that the resulting FOV is relatively centered and rearward facing. As one example of operation during the transport situation and additionally referring to FIGS. 1B and 4, the controller 104 may render the feed from the left rear forward-facing camera 108c on the first or left primary display device 140a, the feed from the right rear forward-facing camera 108c on the second or right primary display device 140b, and the feed from the rear camera 108g on the third or center primary display device 140c.

Figure 5B:
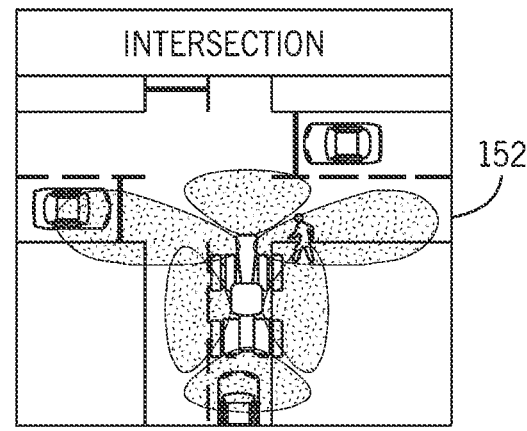

Referring to FIG. 5B, an implementation of the vision system 102 is depicted when the work vehicle 100 is in an "intersection" situation or mode, e.g., when the work vehicle 100 is approaching a roadway intersection or otherwise turning onto a roadway or other type of path. In the intersection situation, a front camera (e.g., camera 108a of FIG. 1B), left and right mirror cameras (e.g., cameras 108d of FIG. 1B), left and right intersection cameras (e.g., cameras 108e of FIG. 1B), and rear camera (e.g., rear camera 108g of FIG. 1B) may be active. As one example of operation during the intersection situation and additionally referring to FIGS. 1B and 4, the controller 104 may render the feed from the left intersection camera 108e on the first or left primary display device 140a, the feed from the right intersection camera 108e on the second or right primary display device 140b, and the feed from the rear camera 108g on the third or center primary display device 140c. Alternatively or additionally, the feed from the left and right mirror cameras 108d may be displayed with or in lieu of the intersection cameras 108e on the first and second primary display devices 140a, 140b, respectively, and the feed from front camera 108a may be displayed with or in lieu of the rear camera 108g on the third primary display device 140c.

Figure 5C:
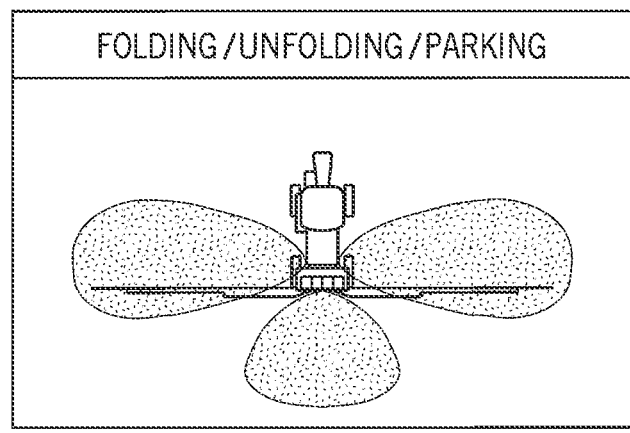

Referring to FIG. 5C, an implementation of the vision system 102 is depicted when the work vehicle 100 is in a folding/unfolding/parking (or "set-up") situation or mode, e.g., when the work vehicle is folding or unfolding an implement such as sprayer boom, hooking up to other implements or apparatuses, and/or when parking or maneuvering. In an example set-up situation, left and right C-post cameras (e.g., cameras 108f of FIG. 1B) and rear camera (e.g., camera 108g of FIG. 1B) may be active. As one example of operation during the set-up situation and additionally referring to FIGS. 1B and 4, the controller 104 may render the feed from the left C-post camera 108f on the first or left primary display device 140a, the feed from the right C-post camera 108f on the second or right primary display device 140b, and the feed from the rear camera 108g on the third or center primary display device 140c.

Figure 5D:
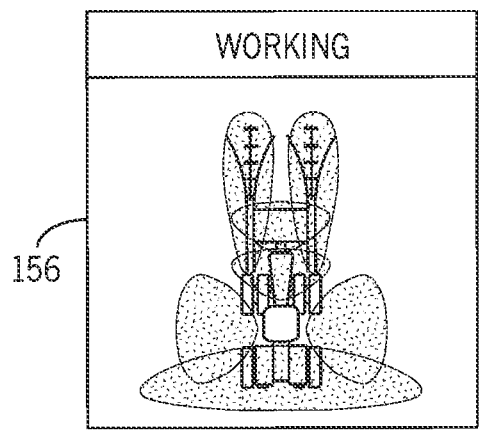

Referring to FIG. 5D, an implementation of the vision system 102 is depicted when the work vehicle 100 is in a "working" situation or mode, e.g., when the work vehicle 100 is performing a designated work task. In an example working situation, front camera (e.g., camera 108a of FIG. 1B), left and right front forward-facing cameras (e.g., cameras 108b of FIG. 1B), left and right mirror cameras (e.g., cameras 108d of FIG. 1B), and rear camera (e.g., camera 108g) may be active. As one example of operation during the working situation and additionally referring to FIGS. 1B and 4, the controller 104 may render the feed from the left front forward-facing camera 108d on the first or left primary display device 140a, the feed from the right front forward-facing camera 108b on the second or right primary display device 140b, and the feed from the rear camera 108g on the third or center primary display device 140c. Alternatively or additionally, the feed from the left and right mirror cameras 108d may be displayed with or in lieu of the front forward-facing cameras 108b on the first and second primary display devices 140a, 140b, respectively, and the feed from front camera 108a may be displayed with or in lieu of the rear camera 108g on the third primary display device 140c.

Figure 5E:
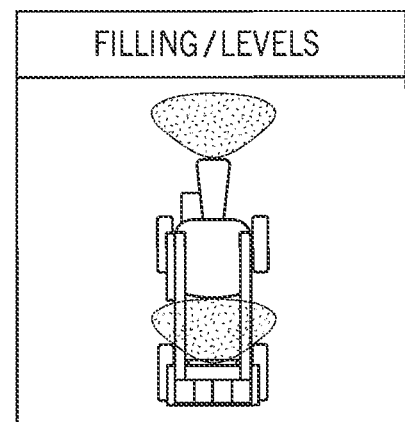

Referring to FIG. 5E, an implementation of the vision system 102 when the work vehicle is in a "filling" situation or mode, e.g., when the work vehicle is performing a being loaded (or unloaded) with material. In an example filling situation, one or more front alignment cameras may be active to provide a view of a coupling or engagement with a source of material; and one or more tank or bin cameras may be active to provide an indication of the level material in the tank or bin. As one example of operation during the working situation and additionally referring to FIG. 4, the controller 104 may render the feed from the front alignment camera on one or both of the first and/or second primary display devices 140a, 140b, and the feed from the tank or bin camera on the third or center primary display device 140c. Similar or analogous views may also be initiated by one or more error or alert codes associated with a diagnostic system on the vehicle 100. For example, an error code associated with an issue with a bin or tank (e.g., a clog or empty signal) may initiate an automatic view of the bin or tank, as shown in FIG. 5E such that an operator may visually inspect the area. As further examples, diagnostic codes associated with plugs, missed or skipped paths, or the like may initiate a view of the subject vehicle or implement element or aspect of the environment.

Accordingly, the vision system 102 depicted in FIGS. 5A-5E provides an experience for an operator that is consistent across situations. In other words, although the particular views or feeds change, the structure of left, right, and center views between the cameras 108 and the display devices 140 is maintained.

Figure 6:
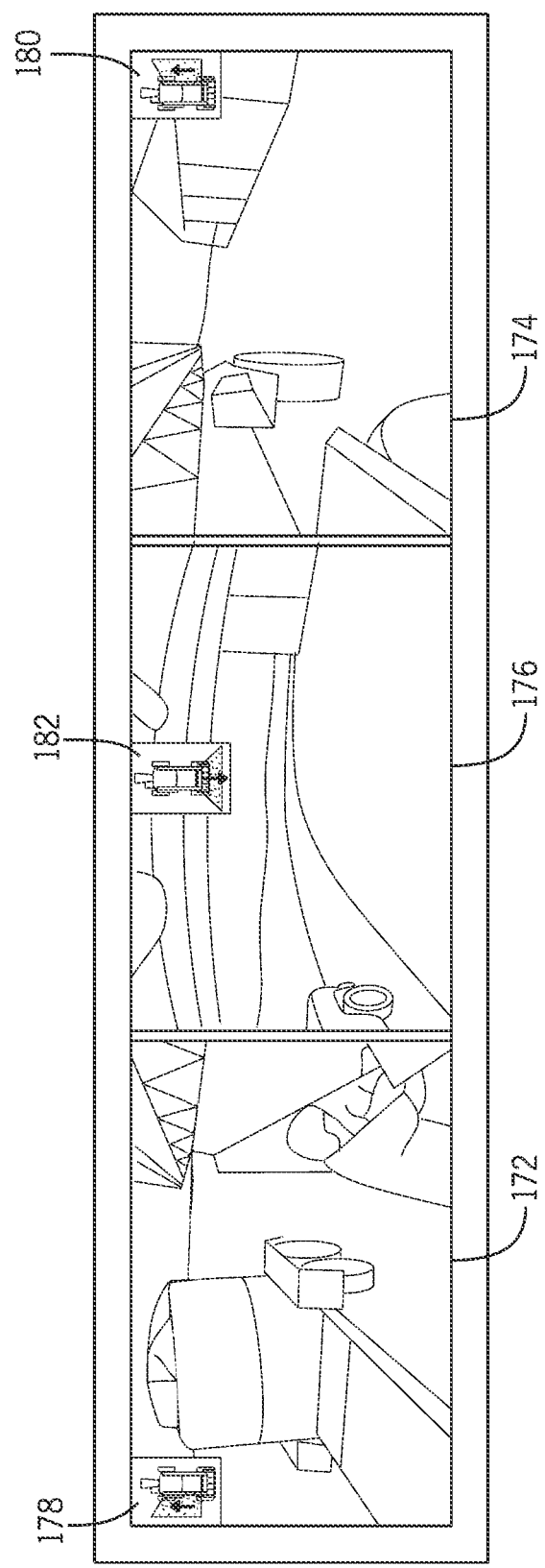
FIG. 6 is an example display generated by the vision system in accordance with an embodiment of this disclosure.

The views of FIG. 6 depict one example implementation of the visual displays rendered on a first primary display device 172 (e.g., corresponding to display device 140a of FIG. 4), a second primary display device 174 (e.g., corresponding to display device 140b of FIG. 4), and a third primary display device 176 (e.g., corresponding to display device 140a of FIG. 4). The situation depicted on the primary display devices 172, 174, 176 in FIG. 6 corresponds to the transport situation of FIG. 5A. As such, the feed from the left rear forward-facing camera (e.g., camera 108c of FIG. 1B) is rendered on the first or left primary display device 172, the feed from the right rear forward-facing camera (e.g., camera 108c of FIG. 1B) is rendered on the second or right primary display device 174, and the feed from the rear camera (e.g., camera 108g of FIG. 1B) is rendered on the third or center primary display device 176.

The vision system discussed herein may further be embodied as a method for a work vehicle. In particular, the method includes initiating operation of the vision system; determining settings associated with the vision system; determining a situation of the work vehicle associated with the vision system; identifying selected feeds based on the situation and/or operator input; identifying context information associated with the selected feeds; generating display signals for selected display devices for the selected feeds; and displaying the selected feeds on selected display devices.

Embodiments of the multi-camera vision system can be utilized in conjunction with various different types of work vehicles; and, further, that the vehicle cameras can capture views of any portions or regions of the environment surrounding or adjacent a work vehicle. Further, description of the manner in which the multi-camera display and the associated display arrangement, display devices, and/or graphical user interfaces appear in the illustrated examples is provided purely by way of non-limiting illustration; noting that the "look and feel" of the displays on the display devices will inevitably vary among embodiments and may be customizable to customer or operator preferences.

Accordingly, the present disclosure provides a multi-camera vision system and method for a work vehicle that provide more intuitive and consistent operator experience.

Also, the following examples are provided, which are numbered for easier reference.

1. A work vehicle comprising: an operator cabin defining a first operator field of view (FOV) aligned with a longitudinal axis extending in a travel direction of the work vehicle, the operator cabin defining a second operator FOV extending along a transverse axis at an angle to the longitudinal axis; one or more display devices within the operator cabin defining a plurality of display areas arranged at a first side, a second side, and a central location between the first and second sides relative to the first operator FOV; a plurality of cameras carried by the work vehicle and coupled to the one or more displays to display feeds at the plurality of display areas, the plurality of cameras including: a first set of the plurality of cameras at or trained on the first side, the second side, and the central location between the first and second sides relative to the first operator FOV; and a second set of the plurality of cameras at or trained on a first side, a second side, and a central location between the first and second sides relative to the second operator FOV; and a control system having processing architecture configured to control, or receive control instructions regarding, the selection of feeds to display at the plurality of display areas, the control system is configured to: when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

2. The work vehicle of example 1, wherein the first set of the plurality of cameras includes a first forward facing camera positioned on the first side of the work vehicle and a second forward facing camera positioned on the second side of the work vehicle; and wherein the first mode of operation is a transport mode in which the first set of feeds includes the feed from the first forward facing camera provided on the display area at the first side and the feed from the second forward facing camera provided on the display area at the second side.

3. The work vehicle of example 2, wherein the second set of the plurality of cameras includes a first transverse facing camera positioned on the first side of the work vehicle and a second transverse facing camera positioned on the second side of the work vehicle; and wherein the second mode of operation is an intersection mode in which the second set of feeds includes the feed from the second transverse facing camera provided on the display area at the first side and the feed from the second transverse facing camera provided on the display area at the second side.

4. The work vehicle of example 3, further comprising at least one sensor coupled to the control system and configured to collect mode data, and wherein the control system is configured to automatically transition between the transport mode and the intersection mode based on the mode data.

5. The work vehicle of example 1, wherein the first set of the plurality of cameras includes a first camera positioned on a first C-post on the first side of the work vehicle and a second camera positioned on a second C-post on the second side of the work vehicle; and wherein the first mode of operation is a set-up mode in which the first set of feeds includes the feed from the first camera provided on the display area at the first side and the feed form the second camera provided on the display area at the second side.

6. The work vehicle of example 5, wherein the first set of the plurality of cameras further includes a third camera positioned on a rear portion of the work vehicle and facing rearward; and wherein, in the set-up mode of operation, the first set of feeds includes the feed from the third camera provided on the display area in the central location.

7. The work vehicle of example 5, wherein the second set of the plurality of cameras includes a third camera positioned on a forward portion of the work vehicle on the first side and facing forward and a fourth camera positioned on the forward portion of the work vehicle on the second side and facing forward; and wherein the second mode of operation is a working mode in which the second set of feeds includes the feed from the third camera provided on the display area at the first side and the feed from the fourth camera provided on the display area at the second side.

8. The work vehicle of example 5, wherein the second set of the plurality of cameras includes a third camera positioned on the first side of the work vehicle and facing in a first transverse direction and a fourth camera positioned on the second side of the work vehicle and facing in a second transverse direction; and wherein the second mode of operation is a working mode in which the second set of feeds includes the feed from the third camera provided on the display area at the first side and the feed from the fourth camera provided on the display area at the second side.

9. The work vehicle of example 1, further comprising a tank positioned behind the operator cabin; wherein the first set of the plurality of cameras includes a first camera oriented towards the tank; and wherein the first mode of operation is a filling mode in which the first set of feeds includes a first camera feed from the first camera provided on the center display area.

10. The work vehicle of example 1, wherein the first operator cabin includes a first headliner and the display area at the central location of the first set of display devices is positioned on or in the first headliner.

11. The work vehicle of example 10, wherein the first operator cabin further includes a first windshield at least partially bounded by a first side C-post and a second side C-post, and the display area at the first side location of the first set of display devices is positioned on the first side C-post in the first cabin and the display area at the second side location of the first set of display devices is positioned on the second side C-post in the first cabin.

12. The work vehicle of example 10, wherein the display area at the first side location of the first set of display devices and the display area at the second side location of the first set of display devices are positioned on the first headliner with the display area at the central location in between.

13. The work vehicle of example 1, wherein at least one of the cameras of the first set of the plurality of cameras is positioned on a work implement.

14. A vision system for a work vehicle having an operator cabin defining a first operator field of view (FOV) aligned with a longitudinal axis extending in a travel direction of the work vehicle, the operator cabin defining a second operator FOV extending along a transverse axis at an angle to the longitudinal axis, the vision system comprising: one or more display devices within the operator cabin defining a plurality of display areas arranged at a first side, a second side, and a central location between the first and second sides relative to the first operator FOV; a plurality of cameras carried by the work vehicle and coupled to the one or more displays to display feeds at the plurality of display areas, the plurality of cameras including: a first set of the plurality of cameras at or trained on the first side, the second side, and the central location between the first and second sides relative to the first operator FOV; and a second set of the plurality of cameras at or trained on a first side, a second side, and a central location between the first and second sides relative to the second operator FOV; and a control system having processing architecture configured to control, or receive control instructions regarding, the selection of feeds to display at the plurality of display areas, the control system is configured to: when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

15. The vision system of example 14, wherein the first set of the plurality of cameras includes a first forward facing camera positioned on the first side of the work vehicle and a second forward facing camera positioned on the second side of the work vehicle; and wherein the first mode of operation is a transport mode in which the first set of feeds includes the feed from the first forward facing camera provided on the display area at the first side and the feed from the second forward facing camera provided on the display area at the second side.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
    an operator cabin defining a first operator field of view (FOV) aligned with a longitudinal axis extending in a travel direction of the work vehicle, the operator cabin defining a second operator FOV extending along a transverse axis at an angle to the longitudinal axis;
    one or more display devices within the operator cabin defining a plurality of display areas arranged at a first side, a second side, and a central location between the first and second sides relative to the first operator FOV;
    a plurality of cameras carried by the work vehicle and coupled to the one or more displays to display feeds at the plurality of display areas, the plurality of cameras including:
        a first set of the plurality of cameras at or trained on the first side, the second side, and the central location between the first and second sides relative to the first operator FOV; and
        a second set of the plurality of cameras at or trained on a first side, a second side, and a central location between the first and second sides relative to the second operator FOV; and
    a control system having processing architecture configured to control, or receive control instructions regarding, the selection of feeds to display at the plurality of display areas, the control system is configured to:
        when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and
        when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

2. The work vehicle of claim 1,
    wherein the first set of the plurality of cameras includes a first forward facing camera positioned on the first side of the work vehicle and a second forward facing camera positioned on the second side of the work vehicle; and
    wherein the first mode of operation is a transport mode in which the first set of feeds includes the feed from the first forward facing camera provided on the display area at the first side and the feed from the second forward facing camera provided on the display area at the second side.

3. The work vehicle of claim 2,
    wherein the second set of the plurality of cameras includes a first transverse facing camera positioned on the first side of the work vehicle and a second transverse facing camera positioned on the second side of the work vehicle; and
    wherein the second mode of operation is an intersection mode in which the second set of feeds includes the feed from the second transverse facing camera provided on the display area at the first side and the feed from the second transverse facing camera provided on the display area at the second side.

4. The work vehicle of claim 3, further comprising at least one sensor coupled to the control system and configured to collect mode data, and wherein the control system is configured to automatically transition between the transport mode and the intersection mode based on the mode data.

5. The work vehicle of claim 1,
    wherein the first set of the plurality of cameras includes a first camera positioned on a first C-post on the first side of the work vehicle and a second camera positioned on a second C-post on the second side of the work vehicle; and
    wherein the first mode of operation is a set-up mode in which the first set of feeds includes the feed from the first camera provided on the display area at the first side and the feed form the second camera provided on the display area at the second side.

6. The work vehicle of claim 5,
    wherein the first set of the plurality of cameras further includes a third camera positioned on a rear portion of the work vehicle and facing rearward; and
    wherein, in the set-up mode of operation, the first set of feeds includes the feed from the third camera provided on the display area in the central location.

7. The work vehicle of claim 5,
    wherein the second set of the plurality of cameras includes a third camera positioned on a forward portion of the work vehicle on the first side and facing forward and a fourth camera positioned on the forward portion of the work vehicle on the second side and facing forward; and
    wherein the second mode of operation is a working mode in which the second set of feeds includes the feed from the third camera provided on the display area at the first side and the feed from the fourth camera provided on the display area at the second side.

8. The work vehicle of claim 5,
    wherein the second set of the plurality of cameras includes a third camera positioned on the first side of the work vehicle and facing in a first transverse direction and a fourth camera positioned on the second side of the work vehicle and facing in a second transverse direction; and
    wherein the second mode of operation is a working mode in which the second set of feeds includes the feed from the third camera provided on the display area at the first side and the feed from the fourth camera provided on the display area at the second side.

9. The work vehicle of claim 1, further comprising a tank positioned behind the operator cabin;
    wherein the first set of the plurality of cameras includes a first camera oriented towards the tank; and wherein the first mode of operation is a filling mode in which the first set of feeds includes a first camera feed from the first camera provided on the center display area.

10. The work vehicle of claim 1, wherein the first operator cabin includes a first headliner and the display area at the central location of the first set of display devices is positioned on or in the first headliner.

11. The work vehicle of claim 10, wherein the first operator cabin further includes a first windshield at least partially bounded by a first side C-post and a second side C-post, and the display area at the first side location of the first set of display devices is positioned on the first side C-post in the first cabin and the display area at the second side location of the first set of display devices is positioned on the second side C-post in the first cabin.

12. The work vehicle of claim 10, wherein the display area at the first side location of the first set of display devices and the display area at the second side location of the first set of display devices are positioned on the first headliner with the display area at the central location in between.

13. The work vehicle of claim 1, wherein at least one of the cameras of the first set of the plurality of cameras is positioned on a work implement.

14. A vision system for a work vehicle having an operator cabin defining a first operator field of view (FOV) aligned with a longitudinal axis extending in a travel direction of the work vehicle, the operator cabin defining a second operator FOV extending along a transverse axis at an angle to the longitudinal axis, the vision system comprising:
  one or more display devices within the operator cabin defining a plurality of display areas arranged at a first side, a second side, and a central location between the first and second sides relative to the first operator FOV;
  a plurality of cameras carried by the work vehicle and coupled to the one or more displays to display feeds at the plurality of display areas, the plurality of cameras including:
    a first set of the plurality of cameras at or trained on the first side, the second side, and the central location between the first and second sides relative to the first operator FOV; and
    a second set of the plurality of cameras at or trained on a first side, a second side, and a central location between the first and second sides relative to the second operator FOV; and
  a control system having processing architecture configured to control, or receive control instructions regarding, the selection of feeds to display at the plurality of display areas, the control system is configured to:
    when the work vehicle is in a first mode of operation, display a first set of feeds from the associated first side, second side, and central location of the first set of the plurality of cameras at the plurality of display areas so that the associated feeds are arranged at the first side, the second side, and the central location, respectively, relative to the first operator FOV; and
    when the work vehicle is in a second mode of operation, display a second set of feeds from the associated first side, second side, and central location of the second set of the plurality of cameras at the plurality of display areas so that the associated feeds are arranged at the first side, the second side, and the central location, respectively, relative to the second operator FOV.

15. The vision system of claim 14,
wherein the first set of the plurality of cameras includes a first forward facing camera positioned on the first side of the work vehicle and a second forward facing camera positioned on the second side of the work vehicle; and
wherein the first mode of operation is a transport mode in which the first set of feeds includes the feed from the first forward facing camera provided on the display area at the first side and the feed from the second forward facing camera provided on the display area at the second side.

16. The vision system of claim 15,
wherein the second set of the plurality of cameras includes a first transverse facing camera positioned on the first side of the work vehicle and a second transverse facing camera positioned on the second side of the work vehicle; and
wherein the second mode of operation is an intersection mode in which the second set of feeds includes the feed from the second transverse facing camera provided on the display area at the first side and the feed from the second transverse facing camera provided on the display area at the second side.

17. The vision system of claim 1,
wherein the first set of the plurality of cameras includes a first camera positioned on a first C-post on the first side of the work vehicle and a second camera positioned on a second C-post on the second side of the work vehicle; and
wherein the first mode of operation is a set-up mode in which the first set of feeds includes the feed from the first camera provided on the display area at the first side and the feed from the second camera provided on the display area at the second side.

18. The vision system of claim 17,
wherein the first set of the plurality of cameras further includes a third camera positioned on a rear portion of the work vehicle and facing rearward; and
wherein, in the set-up mode of operation, the first set of feeds includes the feed from the third camera provided on the display area in the central location.

19. The vision system of claim 17,
wherein the second set of the plurality of cameras includes a third camera positioned on a forward portion of the work vehicle on the first side and facing forward and a fourth camera positioned on the forward portion of the work vehicle on the second side and facing forward; and
wherein the second mode of operation is a working mode in which the second set of feeds includes the feed from the third camera provided on the display area at the first side and the feed from the fourth camera provided on the display area at the second side.

20. The vision system of claim 17,
wherein the second set of the plurality of cameras includes a third camera positioned on the first side of the work vehicle and facing in a first transverse direction and a fourth camera positioned on the second side of the work vehicle and facing in a second transverse direction; and wherein the second mode of operation is a working mode in which the second set of feeds includes the feed from the third camera provided on the display area at the first side and the feed from the fourth camera provided on the display area at the second side.

* * * * *

UNITED STATES PATENT AND TRADEMARK OFFICE
CERTIFICATE OF CORRECTION

PATENT NO. : 11,772,562 B2
APPLICATION NO. : 17/673032
DATED : October 3, 2023
INVENTOR(S) : Huenink et al.

It is certified that error appears in the above-identified patent and that said Letters Patent is hereby corrected as shown below:

In the Claims

In Column 22, Line 28, Claim 17, delete "vision system of claim 1," and insert -- vision system of claim 14, --, therefor.

Signed and Sealed this
Fifth Day of December, 2023

Katherine Kelly Vidal
*Director of the United States Patent and Trademark Office*